United States Patent [19]

Brown et al.

[11] Patent Number: 4,598,637
[45] Date of Patent: Jul. 8, 1986

[54] AUTOMATIC BEAN SHELLER

[76] Inventors: Phillip H. Brown; George Spector, both of 233 Broadway Rm 3615, New York, N.Y. 10007

[21] Appl. No.: 645,417

[22] Filed: Aug. 29, 1984

[51] Int. Cl.$^4$ .............................................. A23N 5/00
[52] U.S. Cl. ...................... 99/580; 99/567; 99/568; 99/591
[58] Field of Search .......... 99/451, 537–541, 99/567, 568, 574–576, 581, 582, 584, 580, 588, 591, 600, 609, 646 R; 426/481, 482; 130/30 G, 30 H

[56] References Cited

U.S. PATENT DOCUMENTS 2,248,327  7/1941  Bainer et al. ........................ 99/451
4,397,228  8/1983  Thornton ........................ 99/576 X Primary Examiner—Timothy F. Simone

[57] ABSTRACT

An apparatus for shelling beans is provided and consists of a machine for piercing the beans and separating their pods. The pods are then automatically removed and placed in a container while the beans are automatically removed and placed in another container.

5 Claims, 2 Drawing Figures

AUTOMATIC BEAN SHELLER

BACKGROUND OF THE INVENTION

The instant invention relates generally to shelling machines and more specifically it relates to an apparatus for shelling beans.

Numerous machines have been provided in prior art that are adapted to remove the outer covering or slice an object. For example U.S. Pat. Nos. 2,248,327; 2,783,801 and 3,126,930 all are illustrative of such prior art. While these units may be suitable for the particular purpose to which they address, they would not be suitable for the purposes of the present invention as heretofore described.

SUMMARY OF THE INVENTION

A principle object of the present invention is to provide an apparatus for shelling beans that will strip the pods from the beans more efficiently.

Another object is to provide an apparatus for shelling beans that will shorten the time normally required to complete the shelling of a relatively large quantity of beans.

An additional object is to provide an apparatus for shelling beans that will separate the pods from the beans placing the pods into one container and the beans into another container.

A further object is to provide an apparatus for shelling beans that is simple and easy to use.

A still further object is to provide an apparatus for shelling beans that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
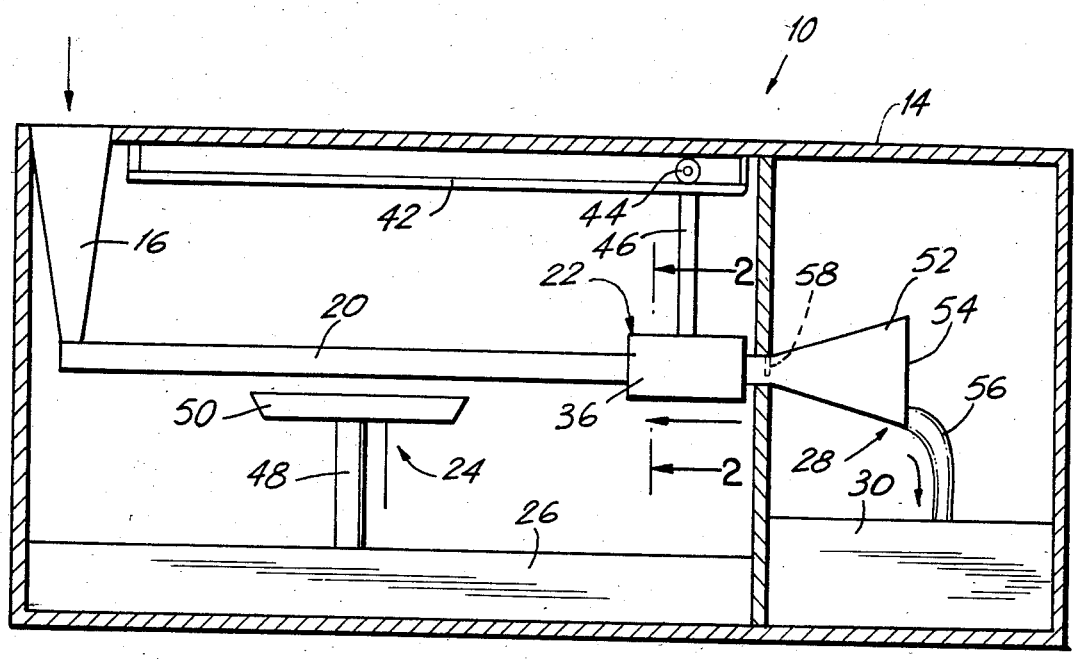
FIG. 1 is an elevational view partly in section of the invention.
Figure 2:
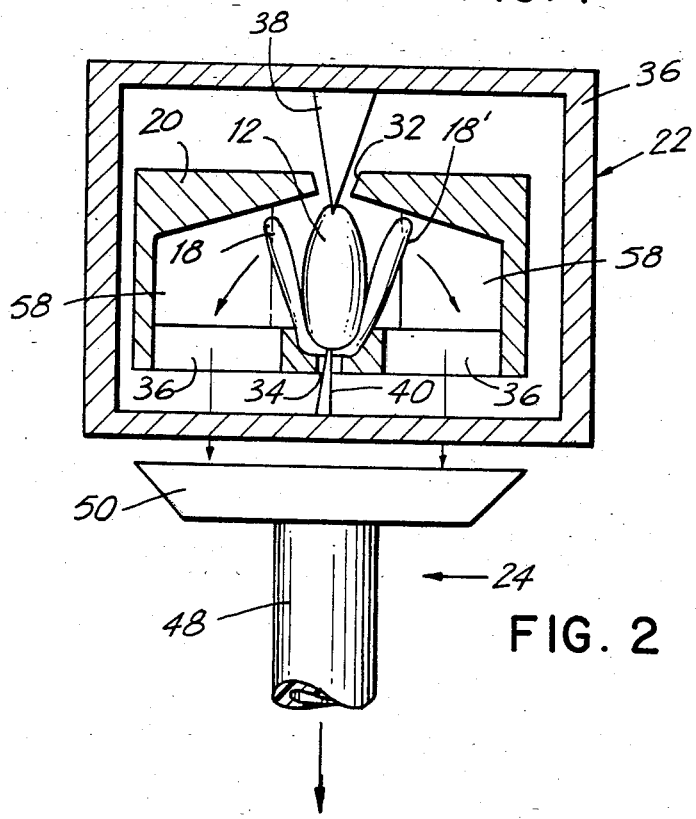
FIG. 2 is a cross sectional view taken along line 2—2 in FIG. 1 showing the internal structure of the movable slicer and horizontal conduit.

Turning now descriptively to the drawings, in which similar reference characters denote similar elements throughout the several views, FIGS. 1 and 2 illustrate an apparatus 10 for shelling beans 12. The apparatus 10 contains an elongated horizontal housing 14. A vertical chute 16 is mounted witin one end of the housing 14 to receive a plurality of the beans 12 having pods 18. A horizontal conduit 20 is mounted within center of the housing 14 and connected to the chute 16 to carry the beans 12 therethrough. A movable slicer 22 travels along the conduit 20 to pierce the beans 12 and separate the pods 18 therefrom.

A device 24 is provided for removing the pods 18 from the conduit while a first container 26 within bottom of the housing is for storing the pods 18. Another device 28 is also provided for removing the shelled beans 12 from the conduit 20 while a second container 30 within bottom of the housing is for storing the shelled beans 12.

As best seen in FIG. 2, the horizontal conduit 20 has a first elongated slot 32 on top and a second elongated slot 34 on bottom with open areas 36, 36 on both sides of the second elongated slot 34 to allow the pods 18 to fall therethrough. The movable slicer 22 further contains a short sleeve 36 that has an open front and back portion so that the sleeve 36 can slideably surround the conduit 20 in spaced relationship. A wide blade 38 extends downwardly from top of the sleeve 36 through the first elongated slot 32 in the conduit 20 to pierce tops of the beans 12. A narrow blade 40 extends upwardly from bottom of the sleeve 36 through the second elongated slot 34 in the conduit 20 to pierce bottoms of the beans 12.

A track 42 is mounted to underside of top of the housing 14 parallel to the conduit 20 with a roller 44 within the track 42. A post 46 extends from the roller 44 to top of the sleeve 36 so that the sleeve 36 can be guided along its travel with the conduit 20.

The device 24 for removing the pods 18 from the conduit 20 consists of a first suction pipe 48 mounted to top of the first container 26. A transverse elongated trough 50 is attached to upper end of the first suction pipe 48 to receive the pods 18 that fall through the open areas 36, 36 in the conduit 20 and allow the pods 18 to travel downward through the first suction pipe 48 into the first container 26.

The device 28 for removing the shelled beans 12 from the conduit 20 consists of a horizontal funnel 52 attached to end of the conduit 20 opposite the chute 16. The funnel 52 has a closed wide end 54. A second suction pipe 56 is mounted between top of the second container 30 and bottom of the closed wide end 54 of the funnel 52 so that the shelled beans 12 can travel downward through the second suction pipe 56 into the second container 30. A pair of barriers 58, 58 are also provided. Each barrier 58 is placed between the funnel 52 and the conduit 20 on either side of the second elongated slot 34 of the conduit to prevent the pods 18 from being sucked out of the second suction pipe 56.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An apparatus for shelling beans which comprises:
   (a) an elongated horizontal housing, having a center, a bottom and opposite ends;
   (b) a vertical chute mounted within one of said ends to receive a plurality of said beans having pods;
   (c) a horizontal conduit mounted within said center of said housing and connected to said chute to carry said beans therethrough;
   (d) slicer assembly moveably mounted on said housing having means for movement along said conduit and piercing said beans on the top and bottom of the bean pods and separate said pods therefrom;
   (e) a second means for removing said pods from said conduit wherein said second means is part of said slicer assembly;

(f) a first container within said bottom of said housing for storing said pods;
(g) a third means for removing said shelled beans from said conduit; and
(h) a second container within said bottom of said housing for storing said shelled beans.

2. An apparatus for shelling beans as recited in claim 1, further comprising said horizontal conduit having a longitudinal top slot and a second longitudinal bottom slot with open areas on both sides of said second slots to allow said pods to fall therethrough.

3. An apparatus for shelling beans as recited in claim 2, wherein said moveable slicer assembly further comprises:
   (a) a sleeve having an open front and back portion, said sleeve slideably encompassing said conduit in spaced relationship therewith including:
   (b) a first blade extending downwardly from top of said sleeve through said top slot in said conduit to pierce the tops of said beans;
   (c) a second blade extending upwardly from the bottom of said sleeve through said bottom slot in said conduit to pierce the bottoms of said beans;
   (d) a track mounted on said housing parallel to said conduit;
   (e) a roller within said track; and
   (f) a post extending from said roller to said sleeve so that said sleeve can be guided along its travel with said conduit.

4. An apparatus for shelling beans as recited in claim 3, wherein said means for removing said pods from said conduit comprises:
   (a) a first suction pipe mounted on the top of said first container; and
   (b) a transverse elongated trough attached to upper end of said first suction pipe to receive said pods that fall through said open areas in said conduit and allowing said pods to travel downward throgh said first suction pipe into said first container.

5. An apparatus for shelling beans as recited in claim 4, wherein said means for removing said shelled beans from said conduit comprises:
   (a) a horizontal funnel attached to end of said conduit opposite said chute, said funnel having a bottom and a closed wide end;
   (b) a second suction pipe mounted between top of said second container and said bottom of said closed wide end of said funnel so that said shelled beans can travel downward through said second suction pipe into said second container; and
   (c) a pair of barriers, each said barrier placed between said funnel and said conduit on either side of said second elongated slot of said conduit to prevent said pods from being sucked out of said suction pipe.

* * * * *